Feb. 9, 1937.  S. F. FARKAS ET AL  2,069,825

ALTERNATING CURRENT REGULATOR

Filed Feb. 19, 1936

INVENTORS: S. F. FARKAS
L. B. HILTON
BY Wayne B Wells
ATTORNEY

Patented Feb. 9, 1937

2,069,825

UNITED STATES PATENT OFFICE 2,069,825

ALTERNATING CURRENT REGULATOR

Samuel F. Farkas, Fairfield, Conn., and Linwood B. Hilton, New York, N. Y., assignors to Bell Telephone Laboratories, Incorporated, New York, N. Y., a corporation of New York Application February 19, 1936, Serial No. 64,699

7 Claims. (Cl. 171—119)

This invention relates to alternating current regulators and particularly to regulators for producing constant alternating current.

One object of the invention is to provide a monocyclic square regulator for producing a constant alternating current that shall have the range of operation thereof extended in an improved manner.

Another object of the invention is to provide a monocyclic square regulator for producing a constant alternating current that shall be protected against overheating in case of no load on the square and that shall have the range of operation thereof extended in an improved manner.

A further object of the invention is to provide a monocyclic square regulator for producing a constant alternating current that shall be protected against overheating by means of a saturated retard coil having a core compound of a nickel iron alloy and that shall have a capacity connected across the protective coil to increase the range of operation of the regulator.

A monocyclic square regulator which comprises two capacity arms and two inductive arms each having the same reactance to currents of the same frequency and arranged in the form of a bridge will deliver constant current when supplied with alternating current at constant potential. However, a regulator of this type is heated to excessively high temperatures when the load circuit is opened and in many cases the capacity arms are destroyed. In order to protect the square against overheating in case the load circuit is opened a coil having a saturated core is connected across the output vertices of the square. When the protective coil is provided with a core composed of iron there is a gradual increasing loss through the coil with increasing load voltage which interferes with the quality of the regulating operation.

In a monocyclic square regulator constructed in accordance with our invention the protective coil having a saturated iron core is replaced by a protective coil having a core composed of an alloy of nickel and iron. The nickel iron alloy which is employed in the core of the protective coil is disclosed in the patent to G. W. Elmen No. 1,586,884, June 1, 1926. A protective coil provided with a core composed of nickel iron alloy is designed to offer large impedance to the flow of current therethrough until a limiting voltage is reached and then very rapidly decrease in impedance as the voltage increases. In a regulator provided with a protective coil of this type there is little loss of current effected through the coil during the useful range of operation of the regulator. The current through the coil is small until the voltage is raised to a point where protection for the regulator is desired. At this point the impedance of the coil being rapidly reduced permits a large current flow therethrough which insures against overheating of the square. A protective coil of the type under consideration serves to increase the useful range of operation of the regulator and insures a flatter regulating characteristic.

In order to further increase the range of operation of the regulator and further flatten the operating characteristic of the regulator a condenser is connected across the protective coil. The condenser is of a size to tune the circuit of the coil and condenser above the frequence of the current supplied to the regulator. The condenser increases the impedance of the shunt circuit and produces a flatter operating characteristic.

Figure 1:
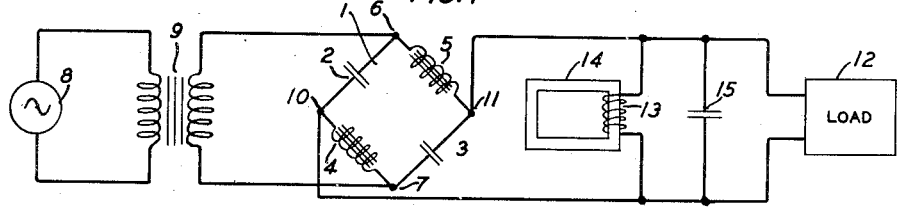
Fig. 1 is a diagrammatic view of a monocyclic square regulator constructed in accordance with the invention.

Referring to Fig. 1 of the drawing a monocyclic square 1 is shown comprising two capacity arms and two inductive reactive arms. The two capacity arms comprise two condensers 2 and 3. The two inductive arms comprise two inductances 4 and 5. The four elements 2, 3, 4 and 5 offer equal reactances to alternating currents of the same frequency. Two vertices 6 and 7 of the monocyclic square 1 are connected to a source of alternating current 8 by means of a transformer 9. The source 8 is assumed to supply alternating current at constant potential to the square 1. The output vertices 10 and 11 of the square are connected to a load 12. In accordance with the well-known principles of a monocyclic square the load 12 will be supplied with constant current if the potential impressed upon the input vertices of the square is maintained constant.

A protective coil 13 which is mounted on a saturated core 14 is connected across the output vertices 10 and 11 of the square 1. The saturated core 14 is preferably composed of a nickel-iron alloy of the type disclosed in the above-mentioned patent to G. W. Elmen No. 1,586,884. The coil 13 serves to protect the monocyclic square 1 against excessive voltages in case the load circuit is open. The coil 13 which is mounted on the saturated core 14 serves to draw sufficient exciting current in case the load circuit is open to protect the square 1 against excessive voltages.

A condenser 15 is connected across the coil 13 to increase the impedance of the combination of the coil 13 and condenser 15 and extend the range of useful operation on the monocyclic square. The condenser and coil combination offers large impedance to current flow at normal operating voltages. The condenser 15 increases the impedance of the shunt circuit and produces a flatter operating characteristic for the regulator.

Figure 2:
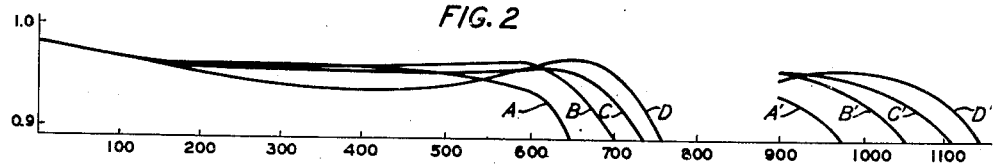
Fig. 2 is a set of curves showing the effects of various capacities connected across the protective coil in extending the regulation range.

Referring to Fig. 2 of the drawing, curves are shown to indicate the effect of the condenser 15 in changing the shape of the operating characteristic of the regulator and the range of operation of the regulator. The abscissae of the curves shown in Fig. 2 represent volts across the load circuit and the ordinates represent current flow through the load circuit. The curve A shows the characteristic of the monocyclic square in Fig. 1 when provided with a protective coil 13 mounted on a silicon steel core and having no condenser in shunt thereto. The range of operation of the regulator with a characteristic as shown in curve A for an output of .945 amperes having a limit of ±1.6% is between 200 volts and 585 volts. The curve C shows the characteristic of a regulator similar to that producing the curve A but with a condenser of 2350 ohms capacitative reactance connected across the protective coil. It will be noted that the characteristic as shown in curve C is flatter and the range of operation is extended. The curve C has a range of operation between approximately 130 volts and 720 volts which has an increase in range of approximately 50%.

The curves D and B show other characteristic curves of the regulator for different values of the condenser 15 connected across the protective coil 13. The curve D was taken when the condenser 15 had a capacitative reactance of 1555 ohms. The curve B was taken when the condenser 15 had a capacitative reactance of 5000 ohms. The curve B which is formed with the highest value of capacitative reactance for the condenser 15 produces a much flatter operating characteristic, but does not have the range of the curves C and D which are formed with the condenser 15 having smaller values of capacitative reactance. The inductive reactance of the coil 13 for the curves A, B, C and D shown in Fig. 2 of the drawing was approximately that shown in curve F, Fig. 3, of the drawing.

Figure 3:
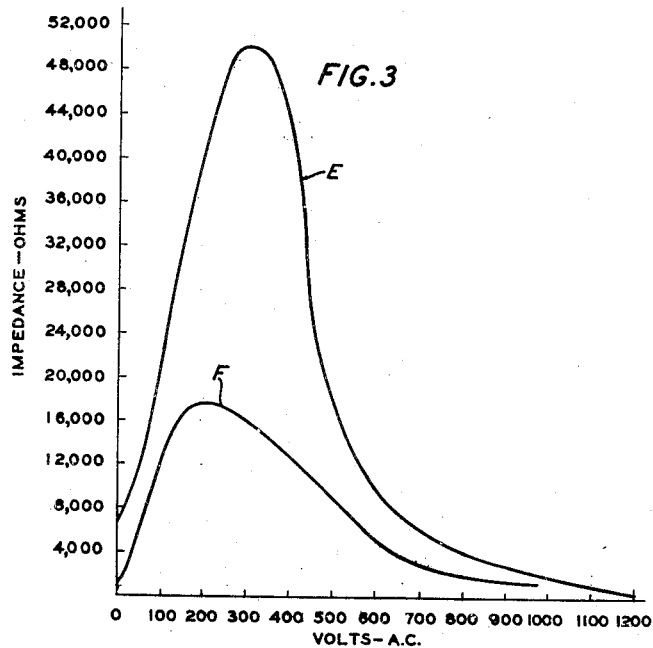
Fig. 3 shows curves comparing the impedance value of the protective coil with a nickel-iron core and with a silicon steel core.

The curves A, B, C and D represent the characteristics of the monocyclic square regulator when the core 14 for the protective coil 13 is formed of silicon steel with an impedance characteristic as shown in curve F of Fig. 3. If the core 14 for the protective coil 13 is formed of nickel steel with a characteristic as shown by the curve E in Fig. 3 of the drawing, the range of operation of the curves A, B, C and D of Fig. 2 are extended as indicated by the curves A', B', C' and D'. The curves A', B', C' and D' were taken under the same conditions as the curves A, B, C and D except that a nickel-steel core with a characteristic as shown in curve E, Fig. 3, was employed for the coil 13.

Referring to Fig. 3 of the drawing it is apparent that the protective coil 13 having a nickel-steel alloy core offers great impedance to the flow of current therethrough until a predetermined limit is reached when the impedance of the coil rapidly decreases. The protective coil 13 of the same size as that used with the nickel-steel alloy core does not offer the same impedance when mounted on a silicon steel core as shown by the curve F when considered with the curve E, Fig. 3, of the drawing. The protective coil 13 provided with a silicon steel core does not have the same impedance as that of a protective coil provided with a nickel-iron core.

Figure 4:
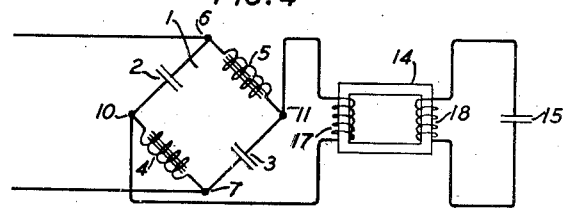
Fig. 4 is a diagrammatic view of a modification of the regulator shown in Fig. 1.

Referring to Fig. 4 of the drawing a modification of the invention is shown wherein the retard coil 13 is replaced by a transformer having a primary winding 17 and a secondary winding 18. In the circuit shown in Fig. 4 the condenser 15 is connected across the secondary winding 18. The regulator shown in Fig. 4 operates in the same manner as the regulator shown in Fig. 1.

Modifications in the circuits and in the arrangement and location of parts may be made within the spirit and scope of the invention, and such modifications are intended to be covered by the appended claims.

What is claimed is:

1. In combination, a constant current regulator having the output circuit thereof connected to a variable load circuit, a coil mounted on a core operated at high flux density and connected across the output circuit of said regulator, and a condenser connected across said coil to extend the useful range of operation of the regulator.

2. In combination, a constant current regulator having an input circuit connected to a source of alternating current and an output circuit connected to a variable load circuit, a coil connected across the output circuit of said regulator and mounted on a core composed of an alloy of nickel and iron and operated at high flux density, and a condenser connected across said coil to extend the useful range of operation of the regulator.

3. In a regulator, a monocyclic square, a constant voltage supply circuit connected to two vertices of said square, inductive means connected to the other two vertices of said square, said inductive means having a core operated at high flux density, a condenser connected across said inductive means for extending the range of the regulator operation and a load circuit connected to said inductive means.

4. In combination, a monocyclic square, a constant voltage supply circuit connected to two vertices of said square, inductive means connected to the other two vertices of said square, said inductive means having a core composed of an alloy of nickel and iron and operated at high flux density, and a load circuit connected to said inductive means.

5. In a regulator, a constant voltage supply circuit, a monocyclic square having two vertices thereof connected to said supply circuit, a load circuit connected to the other two vertices of said monocyclic square and supplied with constant current, a choke coil serving as a protective device and having a core composed of an alloy of nickel and iron connected across said load circuit, the core of said choke coil being substantially saturated under normal operating conditions, and a condenser connected across said choke coil for extending the range of the regulator operation.

6. In combination, a monocyclic square, a constant voltage supply circuit connected to two vertices of said square, a transformer having the primary winding thereof connected across the other two vertices of said square, said transformer having a core operated at high flux densities, a condenser connected across the secondary winding of said transformer and a load circuit connected to said secondary winding.

7. In combination, a monocyclic square, a constant voltage supply circuit connected to two vertices of said square, a transformer having a primary winding, a secondary winding and a core composed of an alloy of nickel and iron and operated at high flux densities, said primary winding being connected to the other two vertices of said square and said secondary winding being connected to a load circuit, and a condenser connected across said secondary winding.

LINWOOD B. HILTON.
SAMUEL F. FARKAS.